United States Patent

[11] 3,632,476

[72] Inventor John H. Fried
 Waterford, Conn.
[21] Appl. No. 821,120
[22] Filed May 1, 1969
[45] Patented Jan. 4, 1972
[73] Assignee Chas. Pfizer & Co., Inc.
 New York, N.Y.

[54] METHOD OF PRODUCING CITRIC ACID BY FERMENTATION
 7 Claims, No Drawings

[52] U.S. Cl. .................................................. 195/37
[51] Int. Cl. .................................................. C12d 13/00
[50] Field of Search .................................. 195/32, 36, 37, 47, 28

[56] References Cited
OTHER REFERENCES

Kudryavtsev et al., Microbiologiya, Vol. 31, pp. 582–5 1962.
Cook; Chem. and Bio. of Yeats, pp. 160 and 301, 1958.
Agnihotri, Chem Abs., Vol. 62, No. 8159h, 1965.
Usami et al., Chem. Abs. Vol. 62 No. 15382f, 1965.

Primary Examiner—A. Louis Monacell
Assistant Examiner—Gary M. Nath
Attorney—Connolly and Hutz ABSTRACT: A process for producing citric acid with certain Candida strains by aerobically fermenting an aqueous carbohydrate-containing nutrient medium in the presence of lead compounds.

METHOD OF PRODUCING CITRIC ACID BY FERMENTATION

BACKGROUND OF THE INVENTION

This invention relates to a process for the production of citric acid by fermentation. In particular, it relates to a process for the production of citric acid which comprises selecting a suitable citric acid-accumulating member of the genus Candida, propagating the member in an aqueous nutrient medium, and recovering therefrom the accumulate citric acid.

Because of its ease of assimilation, palatability and low toxicity, citric acid is one of the most widely used acids in the food and pharmaceutical industry. The acid is widely used as an acidulant in beverages and also as an antioxidant for inhibiting rancidity in fats and oils. Both the acid and its salts are employed as buffers in the preparation of jams, jellies, and gelatin preparations, and are also used as stabilizers in various food products.

Most of the world's supply of citric acid is produced by fermentation processes. The micro-organisms most commonly used in these processes are selected strains of *Aspergillus niger* While these fermentation processes with *Asperigillus niger* are attractive, many difficulties are experienced, For example, over a period of time the citric acid producing nature of the *Aspergillus niger* culture tends to degenerate. Of more importance is the fact that a relatively long period of time, generally more than 7 days, is required for the production of large quantities of citric acid by fermentation with *Aspergillus niger*. This long fermentation time is one of the major costs factors in producing citric acid. Thus it is obvious that the development of a rapid fermentation process for the production of citric acid is of considerable commercial importance. It is known that certain yeast strains of the genus Candida also have the ability to accumulate substantial amounts of citric acid during the aerobic fermentation of aqueous carbohydrate-containing media, but they have not been so efficient as the *Aspergillus niger* producing strains.

SUMMARY OF THE INVENTION

It has been surprisingly discovered that Candida strains that have the ability to accumulate citric acid will accumulate even larger amounts of citric acid by the addition of lead acetate or other lead compounds to the fermentation media in the range of about 0.5 to 1.5 grams per liter. The time required for this process to obtain citric acid yields comparable to those obtained with the usual *Aspergillus niger* cultures is much less, generally one-fourth to one-half as long.

DETAILED DESCRIPTION OF THE INVENTION

The process of this invention is conveniently carried out by first preparing an inoculum of the appropriate Candida culture. The Candida inoculum may be prepared by propagating the Candida cells from a slant under aerobic conditions in an aqueous fermentation medium containing an assimilable carbohydrate, generally glucose; and assimilable nitrogen source, preferably peptone; and sodium chloride. Lead compounds may or may not be added to the inoculum medium. The broth is agitated at room temperature for about 24 hours at which time the pH is usually about 4.5. The rate of growth of the Candida cells is periodically determined by centrifuging the broth for 15 minutes at about 2,000 g. Generally, a Candida cell density (spindown) of 0.5 ml. of Candida cells per 15 ml. of broth is preferred before the broth is used for inoculation.

After determining that the inoculum culture is of suitable Candida cell density, a portion of it is added to the aqueous fermentation medium which contains a carbohydrate, source of assimilable nitrogen and added lead compound. We prefer such carbohydrates as potato or cornstarch molasses, sucrose, glucose, maltose, dextrin, fructose and galactose. Because of its availability and low cost, we generally prefer to use a molasses as the carbohydrate source, and we use amounts equivalent to as much as 50 percent by weight of sugar.

As an available nitrogen source, such nitrogen-containing organic materials as wheat bran, soybean meal, urea, amino acids, peptones and enzymatically digested proteins can be used. We have found the commercially available product YTT, a casein source available from the Sheffield Chemical Company, Norwich, New YOrk, to be a convenient source of assimilable nitrogen. We generally use from 1 to 20 grams of this peptone source per liter of medium. Inorganic compounds may also serve as sources of assimilable nitrogen. Of these we prefer ammonium nitrate, ammonium sulfate and ammonium chloride.

The following mineral cations and anions are considered beneficial for the growth of Candida; sodium, potassium, cobalt, phosphate, and sulfate. It is well known that trace amounts of various vitamins such as biotin also play a role in cell g growth Most of these trace vitamins and essential minerals are present as impurities in the crude nitrogen and carbon sources, and consequently, it is not usually necessary to add them individually to the fermentation medium. Calcium carbonate also promotes the growth of Candida cells and is generally added to the medium.

Lead ions are not usually added to fermentation media because trace amounts of lead are not generally considered beneficial or essential to microbial growth. On the contrary, the toxic effects of lead compounds on cellular activity of all forms life are well known. It is, therefore, surprising that the accumulation of citric acid by citric acid accumulating strains of Candida is enhanced in the presence of certain lead compounds. Useful lead compounds may be inorganic in nature such as lead oxide or lead oxychloride or inorganic lead salts such as lead chloride, lead bromide, lead nitrate, lead thiocyanate, lead thiosulfate, etc. The lead salts of organic acids are effective in enhancing citric acid yields. The preferred salt is lead acetate sulfur of lead) although basic lead acetate can be used. Other useful lead salts of organic acids are lead formate, lead propionate and lead butyrate. It is especially noteworthy that the beneficially effective concentration of lead acetate is limited to the narrow range of from about 0.5 to 1.5 grams per liter. Concentrations of lead compounds below 0.5 grams per liter have little or no effect on citric acid yields or Candida cell growth. At a concentration of about 2.0 grams per liter, lead acetate has little or no effect on citric acid yields; however, there is some inhibitory effect on Candida cell growth which become even more marked at higher lead acetate concentrations. It is understood that the lead salts of dibasic organic acids such as gluconic, malic, fumaric and tartaric acids, and a tribasic acid such as citric acid may also be effectively employed. The amounts of these lead salts must be adjusted on a molar basis to provide the equivalents of about 0.5 to 1.5 grams per liter, the amounts used for lead acetate.

The lead compound is generally added at the time of medium makeup. However, it may be added as a sterile solution or suspension all at once or in aliquots intermittently up to 24 hours after inoculation of the medium.

Lead oxide and lead oxychloride have limited solubility in aqueous fermentation media while lead salts of organic acids such as lead acetate are appreciably soluble. Although at the present time it is not fully understood how these compounds cause the increase in citric acid to occur, such an understanding is not essential in order to practice the invention.

The fermentation, after inoculation, is allowed to proceed aerobically, usually for about 40 to 72 hours, with agitation, at a temperature from about 20° to 37° C., although a temperature of about 28° C. is preferred. Compressed sterile air is forced through the fermentation medium at about one-half volume to volume per volume per minute.

During the initial stages of the fermentation, the pH should preferably not be too low, e.g., not less than about 3.0, otherwise there will be insufficient Candida growth. When, however, sufficient Candida growth has been established, the pH is maintained in the range of about 2.0 to 7.0.

When substantial amounts of citric acid are produced, the acid may be isolated from the fermentation medium by various methods well known to those skilled in the art. As mentioned above, we generally prefer to incorporate calcium carbonate in the fermentation medium, usually an amount of from 5 to 25 g. per liter of fermentation medium. As the citric acid forms, it reacts metathetically with the calcium carbonate, yielding carbon dioxide and insoluble calcium citrate, which can then be conveniently removed from the fermentation medium. It appears that some of the liberated carbon dioxide is metabolized by the yeast cells and thus promotes their growth in the medium. Instead of $CaCO_3$ one can also use $BaCO_3$ BaO, CaO, NaOH, KOH and $NH_4OH$.

It should be understood that when reference is made herein and in the claims to recovering citric acid from the medium, this expression is intended to embrace recovery in the form of a salt, such as the calcium salt, as well as recovery as citric acid per se. The salts can be conveniently converted to the free acid by methods well known to those skilled in the art.

In the present invention, a citric acid accumulating yeast is defined as one which will accumulate at least 1 gram of citric acid per liter of medium (without added lead compound) under the fermentation conditions described. The use of a Candida strain that accumulates less than 1 gram of citric acid per liter of medium is of little or no practical value.

Listed below are the analytical techniques that are used to determine whether or not a Candida strain is capable of accumulating at least 1 gram of citric acid per liter of medium. The analytical methods below are more than accurate enough to detect this amount of citric acid.

In determining whether or not a Candida strain is capable of accumulating such an amount of citric acid, an inoculum of the Candida strain is prepared from an appropriate slant. A portion of the inoculum is then added to the fermentation medium, and the Candida is propagated therein under aerobic conditions at a temperature of about 25° to 28° C. The pH of the medium is maintained at about a pH of 2 to 7. Both the inoculation and fermentation media are sterilized prior to adding the yeast cells, by heating them in steam autoclave for 20 minutes at 20 p.s.i.g. Although, as noted above, the fermentation process of this instant invention is usually quite rapid, it is prudent in selecting strains to allow the fermentation to proceed for about 3 to 7 days to ensure the detection of all Candida strains capable of high production potential.

A typical fermentation medium useful in screening Candida for their ability to accumulate citric acid during carbohydrate fermentation contains the following:

|  | Grams/Liter of Medium |
| --- | --- |
| Cerelose | 150 |
| Peptone (Bacto) | 15 |
| Yeast Extract | 5 |
| NaCl | 4 |
| $CaCO_3$ | 10 |
| Tap Water | q.s. ad 1 liter |

Available from the Difco Laboratories, 920 Henry St., Detroit, Mich., 48201.

The resultant medium is sterilized by heating it 20 minutes in a steam autoclave at 20 p.s.i. After sterilization the final pH is about 7.4. A series of 300 ml. Erlenmeyer flasks are filled with 25 ml. of the medium and inoculated with Candida cells. After the fermentation has been allowed to proceed for 5 to 7 days, the flasks are removed from the rotary shaker, the pH adjusted to about 1.7 to 2 with hydrochloric acid, and the contents filtered or centrifuged to remove the suspension of yeast cells.

The filtrate or supernatant liquid is then analyzed for citric acid by means of the analytical techniques described below.

METHODS OF ANALYSIS

I. Paper Chromatography

The systems below provide a convenient semiquantitative means for determining citric acid in the fermentation medium. Concentrations of citric acid even lower than 1 gram per liter of medium, i.e., 1 mg. per ml. of medium can be readily detected by these chromatographic methods.

1. Solvent System A

This solvent system is a mixture by volume of 80 parts methyl ethyl ketone, 6 parts acetone, 12 parts distilled water and 2 parts formic acid. Citric acid exhibits an Rf of about 0.59 to 0.64 with this system.

2. Solvent System B

This solvent system consists of by volume 1 part formic acid, 2 cineole, and 3 parts n-propanol. The Rf of citric acid with this system is about 0.40 to 0.45.

3. Solvent System C

This solvent system consist of a water-saturated formic acid-ether mixture prepared by shaking together in a separatory funnel a mixture consisting of 2100 ml. of ethyl ether, 300 ml. of formic acid, and 275 ml. of water. After shaking, the upper solvent layer is used as the chromatographic solvent. The Rf of citric acid with this system is about 0.30 to 0.35.

A 5-to 10-microliter sample of the fermentation medium, which has been treated as described above is placed on the paper, and the chromatogram run in the usual manner. We generally use Whatman No. 1 paper as the absorbent and Bromocresol Green as the indicator (prepared by dissolving 0.25 g. of Bromocresol Green in 400 ml. of acetone and adjusting the solution to green color) in these analyses. In all cases an authentic sample of citric acid is run with each chromatogram as a standard.

II. Acetic Anhydride-Pyridine Analysis

This method is described by J. R. Marier and M. Boulet in J. Dairy Sci., 41, 1683 (1958). Because of its simplicity, we generally prefer to use this method to determine quantitatively the amount of citric acid in the medium.

After treating the 25 ml. fermentation medium used in the screening as described above, the filtrate or supernatant is diluted with 0.1 N HCl to 100 ml. Aliquots of this stock solution are then analyzed for citric acid in the manner described in the above article.

III. Gas Chromatography

Another quantitative method for determining citric acid that we have used is a modification of a method described by N. W. Alcock, Anal. Biochem., 33, 2 (1965). The analysis is carried out with an F and M model 500 gas chromatograph fitted with F and M model 1609 flame ionization detector under the following conditions:

Column—Aluminum, 6 ft. × 1/4 in. packed with 5 percent DEGA on ABS
Column T—170° C.
Injection port T—260° C.
Detection block T—260° C.
Helium flow rate—10.5 reading on Brooks R-2-15AAA flowmeter
Hydrogen flow rate—8.0 reading on Brooks R-2-15AAA flowmeter
Airflow rate—12.0 reading on Brooks R-2-15AAA flowmeter
Sample size —5 microliters.

A standard curve is prepared by first weighting out exactly the following amounts of citric acid: 50, 100, 150, 200, and 300 mg. To each of these samples is added 10 ml. of boron trifluoride dissolved in a small amount of ethanol. The mixture is heated at 90° C. for 10 minutes and cooled. Each sample is added to a separatory funnel containing a mixture of 10 ml. of distilled water and 4 ml. of chloroform and vigorously shaken for 30–40 seconds. The lower chloroform layer is separated and added to a teflon-lined, screw-capped 10 ml. test tube. The aqueous phase in the separatory funnel is extracted with two 3 ml. portions of chloroform which are also added to the test tube. A 5-microliter portion of each sample is injected into the chromatograph and a standard curve is prepared by plotting the amount of citric acid as abscissa and the corresponding peak areas of the chromatogram as ordinate. The determination of the peak areas are conveniently calculated by means of an integrator attached to the gas chromatograph.

A sample of the fermentation medium is then taken, the pH is adjusted to about 2.0 with concentration hydrochloric acid, and the mixture either centrifuged or filtered to remove suspended matter. To 5 ml. of the clear solution is added 20 ml. of 2,2-dimethoxypropane. The resultant solution is then evaporated to dryness on an open water bath, set at 60°–80° C. To the dry residue is added 10 ml. of boron trifluoride in methanol. This solution is treated exactly in the same manner as the standard above. The amount of citric acid in the sample is readily calculated by comparison with the standard curve.

It is to be further understood that the process of the present invention also embraces the use of Candida mutants or variants produced by various chemical and physical means, provided, of course, that they exhibit the specified citric acid accumulating ability. Such mutants are produced by techniques such as X-ray and ultraviolet radiation, treatment with nitrogen mustards and organic peroxide and other similar techniques well known to those skilled in the art.

In addition, the use of subcultures, natural mutants, variants and the like is contemplated in carrying out the process of the present invention.

The following examples are provided to more fully illustrate the present invention, but are not to be construed as limiting the scope thereof.

EXAMPLE I

Preparation of Inoculum

A slant containing Candida cells is transferred to a liquid medium prepared from 150 g. of Cerelose, available from Corn Products Sales Co., New York, New York 10022, 15 g. of peptone, 5 g. of yeast extract, 4 g. of sodium chloride, and 1 liter of water. The Candida cells are incubated aerobically with agitation at room temperature for 24 hours. At the end of this time, the pH is about 4.5. The Candida cell content of the medium (spindown) is determined by centrifuging a 15 ml. sample of the medium at 2,000 g. for 15 minutes. When a Candida cell density of 0.5 ml. of yeast cells per 15 ml. of fermentation medium is realized, the cell suspension is used to inoculate the appropriate fermentation medium.

Several ml. of 24 hour old inoculum, of the citric acid accumulating yeast *Candida guilliermondii* ATCC No. 9058 prepared as described above, are added to an aqueous, sterilized nutrient medium containing per liter of medium the following ingredients: 150 g. of Cerelose; 10 g. of calcium carbonate; 4 g. of sodium chloride; 5 g. of Yeast Extract (obtained from the Difco Laboratories, 920 Henry St., Detroit, Mich. 48201); and 15 g. of Peptone (Bacto, obtained from the Laboratories) and 1.5 g. of lead acetate.

Two liters of this medium are stirred for 72 hours at 1,625 three-quarters volume air/minute, and incubation temperature of 28° C. The yield of citric acid of 53 grams/liter compares with 29 grams/liter for the control medium (without lead acetate).

EXAMPLE II

When the fermentation described in example I is repeated at about 37° C., instead of 28° C., substantially the same results are obtained.

EXAMPLE III

Examples I and II are repeated with comparable results using an aqueous nutrient medium containing the following ingredients per liter of medium: an amount of Cane blackstrap molasses equivalent to about 150 grams of glucose; calcium carbonate, 5.0 grams; YTT, 1.0 grams; lead oxide, 1.0 grams.

YTT is a commercial source of nitrogen available from the Sheffield Chemical Co., Norwich, New York, and comprises peptones obtained from the degradation gradation of casein.

EXAMPLE IV

The process of example III is repeated using 0.5 grams of lead oxide per liter in place of 1.0 grams liter, with comparable results.

EXAMPLE V

The process of example I is repeated using 1.0 grams of lead acetate per liter in place of 1.5 grams per liter. The citric acid yield is 46 gram per liter compared with 29 grams per liter for the control medium (without lead acetate).

EXAMPLE VI

The process of example V is repeated using 0.5 grams of lead acetate per liter in place of 1.0 grams per liter, with comparable results.

EXAMPLE VII

The process of example I is repeated using 1.5 grams of lead oxychloride per liter in place of 1.5 grams of lead acetate per liter, with comparable results.

EXAMPLE VIII

The process of example VII is repeated using 0.5 grams of lead oxychloride per liter in place of 1.5 grams per liter, with comparable results.

EXAMPLE IX

The process of Example III is repeated using *Candida lipolytica* ATCC No. 9773 in place of *Candida guilliermondii* ATCC No. 9058, and 1.25 grams of lead acetate per liter in place of 1.5 grams per liter. The yield of citric acid after 72 hours of fermentation is 22 grams per liter compared with 6 grams per liter for the control medium without lead acetate.

EXAMPLE X

The process of example IX is repeated using *Candida albicans* ATCC No. 752 in place of *Candida lipolytic* ATCC No. 9773. After 72 hours fermentation, the citric acid yield is 20 grams per liter compared with 16 grams per liter for the control medium without lead acetate.

EXAMPLE XI

The process of example I is repeated in turn with each of the following lead salts, with comparable results:
lead chloride
lead bromide
lead nitrate
lead thiocyanate
lead thiosulfate
lead formate
lead propionate
lead butyrate

EXAMPLE XII

The process of example IX is repeated in turn with each of the following Candida strains in place of *Candida lipolytica* ATCC No. 9773, with comparable results:

| Candida Strain | ATCC Culture No. |
| --- | --- |
| Krusoides | 7,345 |
| Lipolytica | 8,662 |
| lipolytica | 8,661 |
| melinii | 10,568 |
| monosa | 2,146 |
| monosa | 9,330 |
| mycoderma | 9,888 |
| parapsilosis | 7,330 |
| parapsilosis | 7,333 |
| parapsilosis | 7,336 |
| parapsilosis | 10,265 |
| | |
| Candida Strain | ATCC Culture No. |
| pelliculosa | 2,149 |
| albicans | 20,032 |
| albicans | 753 |
| albicans | 2,091 |
| albicans | 10,259 |
| albicans | 10,261 |
| albicans | 11,651 |

| | |
|---|---|
| albicans | 14,053 |
| brumptii | 10,564 |
| catenulate | 10564 |
| curvata | 10,567 |
| flareri | 9,375 |
| guilliermondii | 9,390 |
| guilliermondii | 14,242 |
| japonica | 14,437 |
| krusei var. saccharicola | 16,047 |

What is claimed is:

1. In a process for producing citric acid by aerobically cultivating a circuit acid accumulating strain of Candida in an aqueous nutrient medium, the improvement which comprises conducting the fermentation in the presence of from about 0.5 to 1.5 grams per liter of lead oxide, lead oxychloride or a lead salt.

2. The process of claim 1 wherein said lead salt is lead acetate.

3. The process of claim 1 wherein said lead salt is lead chloride, lead bromide, lead nitrate, lead thiocyanate, lead thiosulfate, lead formate, lead propionate or lead butyrate.

4. The process of claim 1 wherein said citric acid accumulating strain of Candida is *Candida guilliermondii* ATCC No. 9058.

5. The process of claim 1 wherein said citric acid accumulating strain of Candida *Candida lipolytica* ATCC No. 9773.

6. The process of claim 1 wherein said citric acid accumulating strain of Candida is *Candida albicans* ATCC No. 752.

7. The process of claim 1 wherein said citric acid accumulating strain of Candida is one of the following:

| Candida Strain | ATCC Culture No. |
|---|---|
| krusoides | 7,345 |
| lipolytica | 8,661 |
| lipolytica | 8,662 |
| melinii | 10,568 |
| monosa | 2,146 |
| monosa | 9,330 |
| mycoderma | 9,888 |
| parapsilosis | 7,330 |
| parapsilosis | 7,333 |

| Candida Strain | ATCC Culture No. |
|---|---|
| parapsilosis | 7,336 |
| parapsilosis | 10,265 |
| pelliculosa | 2,149 |
| albicans | 20,032 |
| albicans | 753 |
| albicans | 2,091 |
| albicans | 10,259 |
| albicans | 10,261 |
| albicans | 11,651 |
| albicans | 14,053 |
| brumptii | 10,564 |
| catenulata | 10,565 |
| curvata | 10,567 |
| flareri | 9,375 |
| guilliermondii | 9,390 |
| guilliermondii | 14,242 |
| krusei var. saccharicola | 16,047 |

* * * * *